United States Patent
Masuouka et al.

(10) Patent No.: US 7,610,616 B2
(45) Date of Patent: Oct. 27, 2009

(54) PERVASIVE SECURITY MECHANISM BY COMBINATIONS OF NETWORK AND PHYSICAL INTERFACES

(75) Inventors: Ryusuke Masuouka, Potomac, MD (US); Narendar Shankar, Dallas, TX (US); Zhexuan Song, Beltsville, MD (US); Wei-Iun Chen, Greenbelt, MD (US); Michael Grove, Laurel, MD (US); Yannis Labrou, Baltimore, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 958 days.

(21) Appl. No.: 10/943,143

(22) Filed: Sep. 17, 2004

(65) Prior Publication Data

US 2005/0138410 A1 Jun. 23, 2005

Related U.S. Application Data

(60) Provisional application No. 60/511,693, filed on Oct. 17, 2003.

(51) Int. Cl.
*G06F 21/00* (2006.01)
(52) U.S. Cl. .................................... 726/5; 380/258
(58) Field of Classification Search .............. 726/4, 726/18, 21; 380/247–250
See application file for complete search history.

(56) References Cited

U.S. PATENT DOCUMENTS 7,010,573 B1 * 3/2006 Saulpaugh et al. .......... 709/206

2003/0074575 A1 * 4/2003 Hoberock et al. .......... 713/200
2004/0255158 A1 12/2004 Lin et al. .................. 713/201

FOREIGN PATENT DOCUMENTS

| CN | 1345514 A | 4/2002 |
| CN | 1411224 A | 4/2003 |
| WO | WO 00/59225 | 10/2000 |

OTHER PUBLICATIONS

Office Action dated May 9, 2008 in corresponding Chinese Patent Application No. 200410084109.4 (17 pages).
First Notification of Office Action issued by the State Intellectual Property Office of China on May 9, 2008 in the corresponding Chinese Patent Application No. 200410084109.4 (9 pages with 11 additional pages of English translation).
Notice of Completion of Formalities for Patent Registration with the Notice of Decision of Granting Patent Right for Invention issued by the State Intellectual Property Office of China on Nov. 21, 2008 in the corresponding Chinese Patent Application No. 200410084109.4 (2 pages with three additional pages of English language translation).

* cited by examiner

*Primary Examiner*—Gilberto Barron, Jr.
*Assistant Examiner*—Shahrouz Yousefi
(74) *Attorney, Agent, or Firm*—Staas & Halsey LLP

(57) ABSTRACT

Pervasive security is provided by a combination of physical interfaces and network interfaces to a service to a user includes establishing by the user's client device network connectivity to the service, transmitting by the service an identifier to the user's client device, determining by the service whether the user enters the identifier into the service in physical proximity to the service, and invoking the service once the user has entered the identifier into the service while in physical proximity to the service. The service can provide indication that the service has been granted by sending a control page to the user's client device.

54 Claims, 16 Drawing Sheets

PERVASIVE SECURITY MECHANISM BY COMBINATIONS OF NETWORK AND PHYSICAL INTERFACES

CROSS-REFERENCE TO RELATED APPLICATIONS

This application is related to, and claims the benefit of, U.S. Provisional Application No. 60/511,693, filed Oct. 17, 2003 in the U.S. Patent and Trademark Office the contents of which are incorporated herein by reference.

BACKGROUND OF THE INVENTION

1. Field of the Invention

The present invention is related to the pervasive computing environment, and more particularly, to providing a security mechanism for the pervasive computing environment.

2. Description of the Related Art

Current security functions are provided for the pervasive computing environment by network connectivity level security (WEP/WPA for Wireless LAN), UPnP (Universal Plug and Play) security, and Web Services security. However, as pervasive computing is put into real use, simple and secure mechanisms are required to control the devices as a service. Security mechanisms over the network are often complex and inadequate.

Since network access can be performed from any place, and network security of the related art is often cumbersome and does not consider the device, the convenience to the user of accessing the network is limited.

SUMMARY OF THE INVENTION

The present invention solves the above-mentioned problems.

It is an aspect of the present invention to provide pervasive security by a combination of network and physical interfaces.

It is a further aspect of the present invention to provide security at the service level in a pervasive computer system.

It is another aspect of the invention to provide invisible (minimal user actions) security to a pervasive computer system.

It is still a further aspect of the invention to provide security to a public or semi-public computer network.

The above-mentioned aspects of the present invention are achieved by a method, computer-readable medium, and system which provides pervasive security by a combination of physical interfaces and network interfaces to a service to a user and includes establishing by the user's client device network connectivity to the service, transmitting by the service an identifier to the user's client device, determining by the service whether the user enters the identifier into the service in physical proximity to the service, and invoking the service by a user client device if the user has entered the identifier into the service in physical proximity to the service.

The present invention extends security in the pervasive computing environment to include a pervasive security mechanism by combinations of network and physical interfaces. The present invention is also useful for authentication, authorization, and accounting in the pervasive computing environment. The present invention makes use of physical leverages, such as the need for proximity for wireless communications, limited user interaction, and biometric authentication. Proximity for wireless communications takes advantage of the limited range of wireless media (such as Bluetooth, infra-red, and MINI-BEACON (MINI-BEACON is disclosed in U.S. Provisional Patent Application No. 60/503,878, filed Sep. 22, 2003 in U.S. Patent and Trademark Office, and U.S. patent application Ser. No. 10/929,763, filed Aug. 31, 2004 in the U.S. Patent and Trademark Office, the contents of both of which are incorporated herein by reference).

In the present invention, when a user requests access to a service embodied in a device, the device either (1) returns a key (such as a PIN (personal identification number) or a bar code), or (2) obtains biometric data (fingerprints, iris scan, etc.) of the user accessing the device. The device allows accesses for the user only when (1) the key is given on the physical interface connected directly to the device, or (2) the matching biometric measurement is done on a physical sensor connected directly to the device.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Before presenting a detailed description of the present invention, a discussion of the features of the security mechanism provided by the present invention in the pervasive computing environment is now presented. These features include: invisible security, mutual authentication, access control, accounting, device access models, and leverage of the characteristics of a pervasive environment and the physical embodiments of devices.

The feature of invisible security means that security should have minimal impact on the user experience. There should be very little or no installation and/or need to modify a users environment for maximum user acceptance. This feature is "minimum impact", and not "no impact", because it is sometimes important to let users know about the security settings on their devices.

The feature of mutual authentication means that if necessary, every client needs to authenticate a service before using the service, and every service needs to do the same before allowing a client to access it. The feature of mutual authentication takes place at two different levels: (1) the service discovery phase, and (2) the service composition or execution phase.

The feature of access control is tied to the above-mentioned feature of mutual authentication and defines the logic for a client/service interaction.

The feature of accounting means that clients are charged for usage of services.

The feature of device access models means that since most services run on devices, which could be accessed by multiple clients at the same time, device locking and scheduling of access to devices is hence important.

The feature of leverage of the characteristics of a pervasive environment and the physical embodiments of devices means that since pervasive environments pose different kinds of challenges, they also provide opportunities to use the environmental limitations and the physical proximity to advantage. Useful solutions that are relatively basic including connecting devices to a separate network or using keypads to restrict access to devices provide adequate security mechanisms.

Because of the presence of a user in physical proximity to a device in the pervasive computing environment, a device may need to be physically secured.

In addition, the security mechanism of the present invention is based upon adopted standards, preserves client privacy in the pervasive environment in that the client is required only to reveal the appropriate amount of information to gain access to services, and can be easily adapted to operate in contextual authentication in which contextual criteria (such as the client's location) is authenticated before the service is provided. Anonymity of the user can be preserved in the present invention.

A detailed description of the present invention is now presented.

Figure 1A:
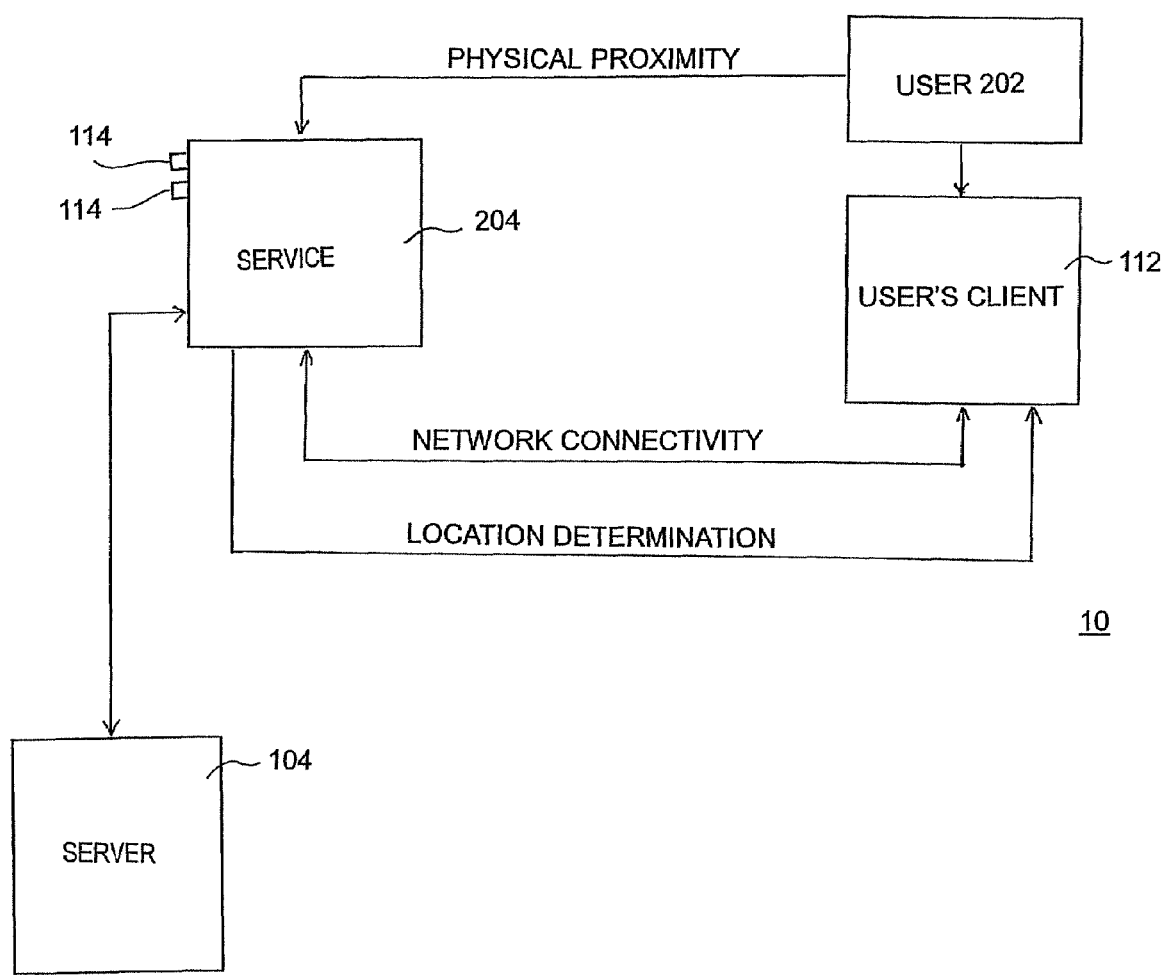
FIG. 1A shows interfaces between a client device and a networked service device providing a service, in the present invention.

FIG. 1A shows an overview of the pervasive security mechanism 10 of the present invention. The pervasive security mechanism 10 of the present invention includes both physical proximity and network connectivity between a user 202 and the user's client device 112 and a service 204, in the present invention. More particularly and in accordance with the present invention, the user 202 and the user's client device 112 are in physical proximity to the service 204 being provided to the user's client device 112. In addition, the user's client device 112 establishes network connectivity between the user's client device 112 and the service 204. This network connectivity may be wired connectivity, a wireless local area network (Wireless LAN), Bluetooth, infra-red, or other pathways. Moreover, HTTPS may be provided in the network connectivity between the user's client device 112 and the service 204.

Optionally, and also as shown in FIG. 1A, the service 204 may engage in location determination of the user's client 112 to determine whether the user's client 112 is in physical proximity to the service 204.

Referring again to FIG. 1A, the service 204 provides to the user's client 112 credentials, a token, a personal identification number (PIN), a pass phrase, a barcode, etc., through the network connectivity, enabling the user 202 to validate to the service 204 that the user and the user's client device 112 are in physical proximity to the service 204. Optionally, the service 204 is provided with an input device 114 physically coupled to the service 204, such as a keypad, allowing the user 202 to type a PIN into the keypad. For example, the user 202 of the user's client device could be instructed by the service 204 to press a button on the input device 114 physically coupled to the service 204 or to type in a PIN to the input device 114 physically coupled to the service 204 previously communicated from the service 204 to the user's client device 112, to validate that the user is in physical proximity to the service 204, thus enabling the service 204 to be invoked by the user through the user's client device 112.

Examples of the present invention are presented using a (PIN, keypad) pair as (input, input device). In alternate embodiments of the present invention, pairs of (input, input device) include a (pass phrase, keyboard) pair and a (bar code, bar code reader) pair, and these alternate embodiments are applicable to the below-mentioned examples of the present invention.

In the present invention, connectivity between a user and service is established at the network level when the service returns a PIN to the user (typically through a network) and at the physical level when the user types the PIN into the service. The PIN is normally returned to the user by the service in plain text, which may be intercepted by other users. However, since the other users would not be physically in front of or in physical proximity to the service, only the user for which the PIN was generated and returned can use the PIN to invoke the services. Alternatively, to increase security (but potentially decrease anonymity of the user) the PIN may be encrypted by the service and decrypted by the intended user, to avoid being intercepted.

In addition, the service 204 may track the network ID of the user's client 112.

Optionally, the service 204 is in communication with a server 104. The server provides to the service 204 keys, tokens, credentials, and/or biometrics during a check-in/check-out procedure (discussed herein below) that the service 204 uses to authenticate the user's client 112. These keys, tokens, credentials, and/or biometrics are communicated from the service 204 to the user's client 112. The service 204 optionally includes input devices 114 such as a token reader or a biosensor. Prior to invoking the service 204, the user's client 112 must validate that the user's client 112 is in physical proximity to the service 204 by inputting to the input device 114, for example, a token for the service 204 that was previously communicated from the service 204 to the user's client 112.

Figure 1B:
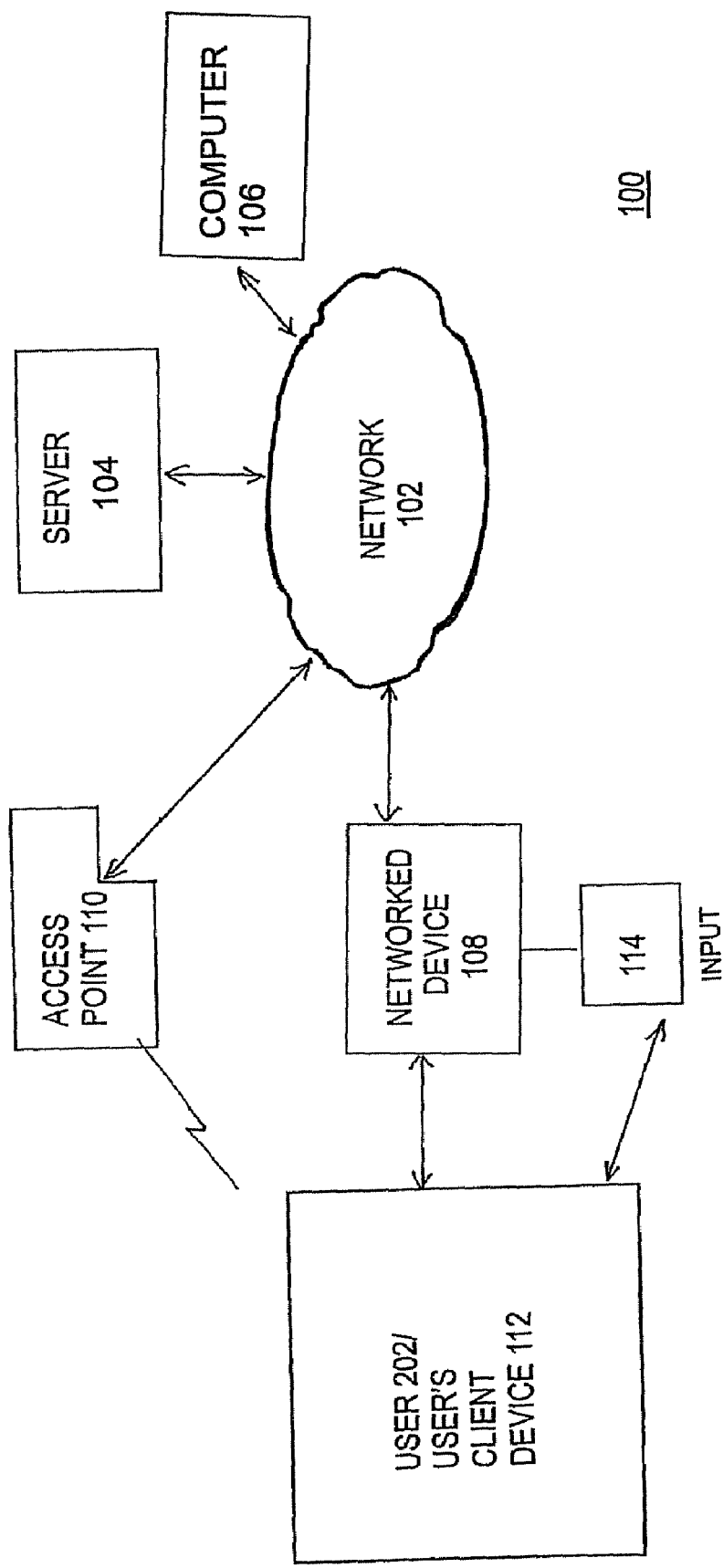
FIG. 1B shows an overview of a pervasive computing system.

FIG. 1B shows a pervasive computing system 100. As shown in FIG. 1B, the pervasive computing system 100 includes a network 102 which includes several servers 104, several computers 106, several networked service devices 108, and several access points 110. These access points 110 allow client devices 112 to access the network 102, either through a wired connection between the client device 112 and the access point 110, or through a wireless connection between the client device 112 and the access point 110 (such as through wireless LAN, or Bluetooth). Through access to the network 102, the client devices 112 gain access to services 204 (not show in FIG. 1B) provided by servers 104, computers 106, networked service devices 108, through the network 102. Servers 104, computers 106, networked service devices 108 may include processors, keyboards, displays, memory, input devices, etc.

That is, networked service devices 108 are physical embodiments that are connected to the network 102 and providing services 204 of the pervasive computer system 100 to a user or to a client device 112. For example, a networked service device 108 may be display unit, a projector, a printer or any other physical point providing a service.

An example of a pervasive computing system is TASK COMPUTING, as disclosed in U.S. Provisional Patent Application No. 60/434,432, filed Dec. 19, 2002 U.S. Provisional Patent Application No. 60/501,012, filed Sep. 9, 2003, U.S. Provisional Patent Application No. 60/511,741, filed Oct. 17, 2003, and U.S. patent application Ser. No. 10/733,328, filed Dec. 12, 2003 in the U.S. Patent and Trademark Office, the contents of all of which are incorporated by reference.

TASK COMPUTING includes the service discovery phase, and the service composition and execution phase, and these services would be accessed by a user 202 through the client device 112 in communication with an access point 110 or directly through a networked service device 108, in an example related to the pervasive computer system 100 of FIG. 1B.

Figure 2:
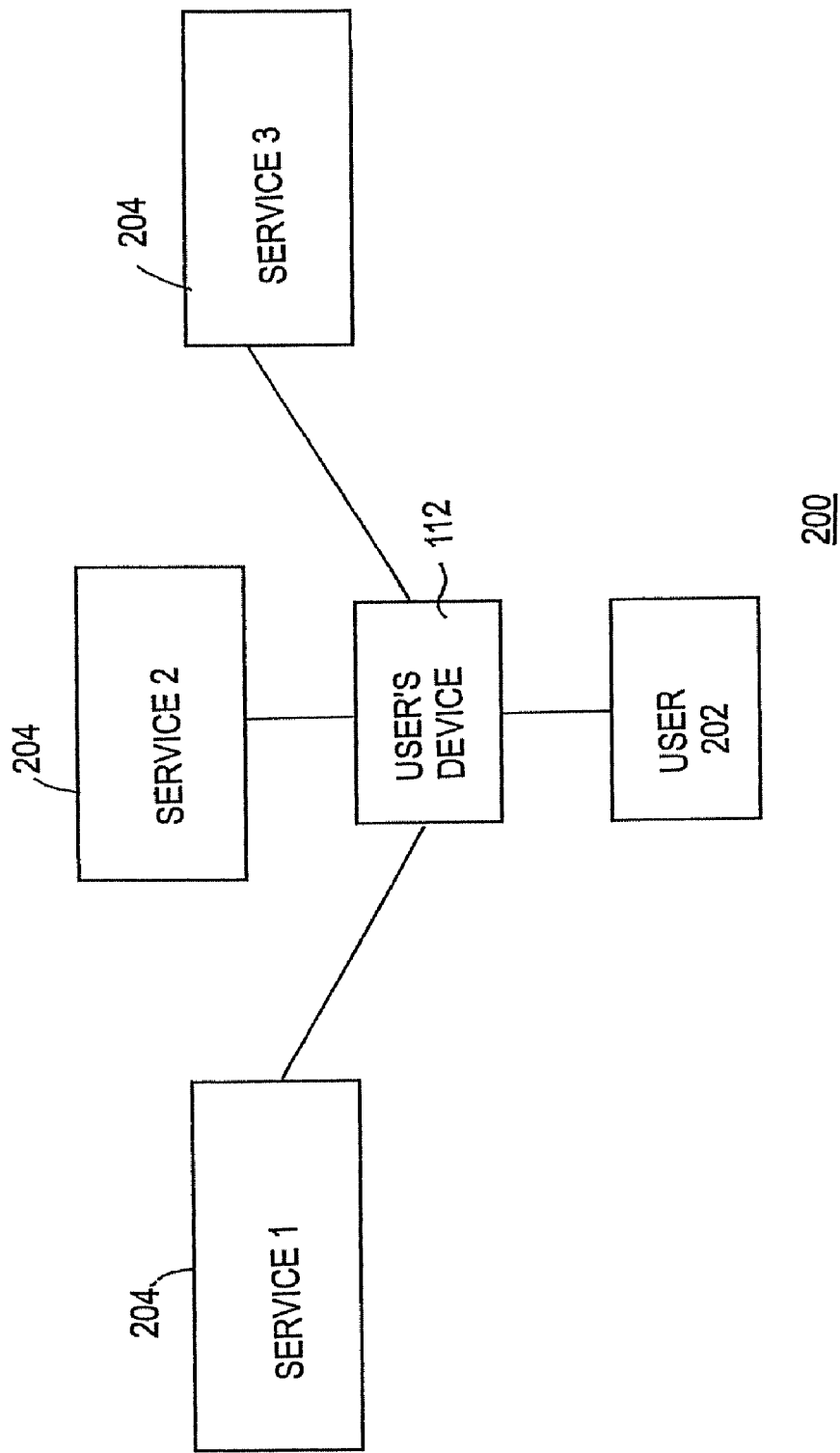
FIG. 2 shows a pervasive computing system.

FIG. 2 shows an example 200 of a user 202 accessing services 204 provided in a pervasive computer system 100. These services 204 are provided, variously, by the above-mentioned servers 104, computers 106, and networked service devices 108 to the user 202 interacting with a client device 112 which accesses the network 102. Examples of these services 1, 2, and 3 204 include printing services, projector services, display services, map services, etc.

Referring again to FIG. 1B, as shown in the pervasive computing system 100 in FIG. 1B, a client device 112 must be in physical proximity to a networked service device 108 providing a service 204 to the user. For example, networked service device 108 may include an input 114 (such as a keypad, a keyboard, a microphone, a camera, etc., explained herein below) for the user 202 to enter a PIN to gain access to the networked service device 108 or service 204.

The pervasive security mechanism 10 of the present invention determines which of multiple user's client devices 112 is granted access to a particular service 204.

That is, the present invention includes a system which inputs an identifier to a service provided by the pervasive computer system, authenticates the identifier, authorizes use of the service based on the authentication of the identifier, and provides invisible security to the system using at least one of a check-in/check-out function and a leasing function.

In the present invention, security provided at the networked service device 108 or access point 110 which is providing a selected service 204 to the user 202 or client device 112. That is, the networked service devices 108 and access points 110 which interface with the client device 112 to provide services 204 of the network 102 include processors executing software programs which cause the networked service devices 108 or access points 110 execute the pervasive security functions explained herein below.

Figure 3:
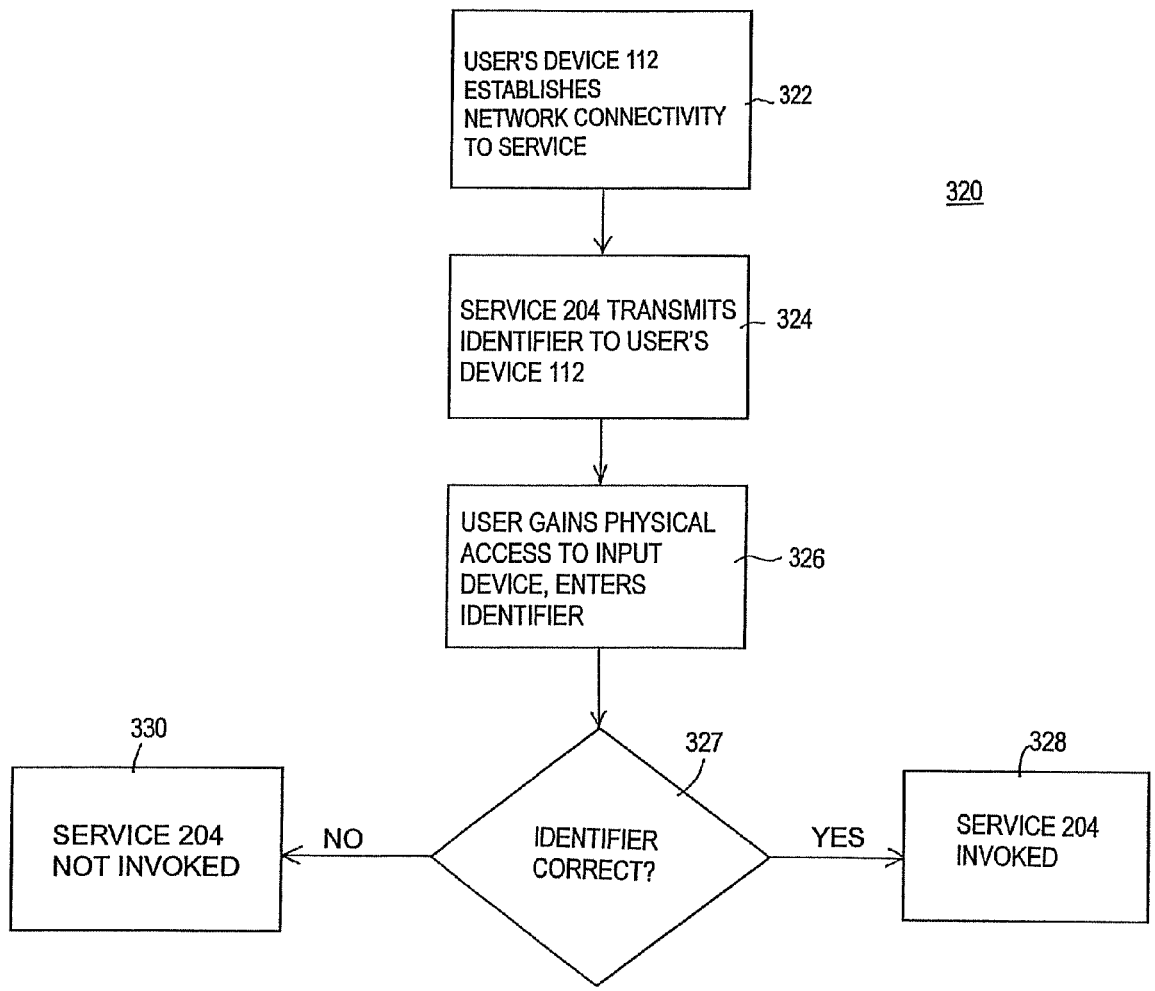
FIG. 3 shows a high-level flowchart of pervasive security by a combination of network and physical interfaces of the present invention.

FIG. 3 shows a high-level flowchart 320 of pervasive security by a combination of network and physical interfaces of the present invention.

Referring now to FIG. 3, the user's device 112 establishes 322 network connectivity to a service 204. The service 204 then transmits 324 an identifier to the user's device 112. When the user 202 gains 326 physical access to the input device 114 of the service 204, the user enters the identifier. If the user 202 enters 327 the correct, valid identifier into the service 204, the service 204 is invoked 328. Otherwise, the service 204 is not invoked 330.

The present invention includes several embodiments to provide security: (1) a check-in/check-out function, (2) device scheduling, (3) security through location determination, and (4) lease architecture.

Embodiments of the present invention included as the pervasive security mechanism 10 by a combination of physical interfaces and network interfaces are now explained.

The Check-in/check-out function 400 is explained with reference to FIG. 4, after a brief overview of the check-in/check-out function 400.

Through the check-in/check-out function, the present invention provides invisible security. The check-in/check-out function provides all the necessary credentials to the client device 112 during a check-in phase, and further performs accounting. These credentials include certificates, keys, biometric identifiers, or smart tokens. These credentials could be given to the client device 112 through an isolated wireless network, which has only necessary and sufficient connectivity to be able to log-in user entry times, or constrained channels like infrared or Bluetooth or handed physically if it is a physical object. These credentials are generated and maintained by, for example, a server 104 in communication with the network 102.

In the case of certificates, both client and service certificates provide for mutual verification of each other. In the case of shared keys, the shared keys act as cryptographic glue, which lets the client device 112 and the server 104 authenticate themselves.

Biometric identifiers, like fingerprints, face recognition, and iris patterns, are used as client-side 112 credentials for authentication. That is, the user 202 of the client device 112 must be authenticated to the service 204 and be in physical proximity to the service 204 as a condition to the service 204 being provided to the user 202 at a particular networked service device 108. Biometrics provides a high level security for client device 112 authentication.

Smart tokens are cards or other physical objects. These smart tokens can also be used for client-side 112 authentication. A smart token is equipped with an infrared transmitter, a simple bar code, an RFID (radio frequency identification) tag, a Bluetooth transmitter, etc. which has to be presented before access to a service 204 is provided by pervasive computer system 100. This provides for authentication (where the service 204 can understand and accept or reject the bar code or infrared beacon) and accounting. Moreover, smart tokens provide location and identity authentication because of the property of constrained channels, which ensures that the holder of the smart token is in physical proximity to the service 204.

The use of proximity includes the entire spectrum ranging from infra-red range, RF range, to bar code range, which is nearly zero distance. Physical proximity is a strong security function because physical proximity is directly related to physical security. That is, if the holder of a smart token has been authenticated by virtue of the holder having the right token and is in physical proximity to the service 204, the security of the system could be compromised only if he is not allowed to be physically inside of the building.

Related to the use of proximity is the use of physical artifacts. Physical artifacts, like key pads 114, touch screens, and buttons, are provided on networked service devices 108 to make sure that only a user 202 who is close to the service 204 can use the service 204.

The use of smart tokens or physical artifacts are appropriate where the user 202 is close to the services 204 to be accessed.

Also related to the use of proximity is the use of a real "key" to lock/unlock the networked service device 108 or service 204.

Accounting could be implemented using certificates, keys, or smart tokens. Whenever a smart token is used (that is, whenever an infrared beacon is broadcast or whenever a bar code is scanned) a service 204 being accessed can record a time stamp and charge the client device 112 accessing the service 204 accordingly. In one embodiment of the present invention, the use of time slices (explained hereinbelow) is also included in the smart token cards, where each use of the card corresponds to a fixed time slice.

During the check-out procedure, all credentials given to the client devices 112 are revoked. The accounting procedures are used to charge the client device appropriately.

Figure 4:
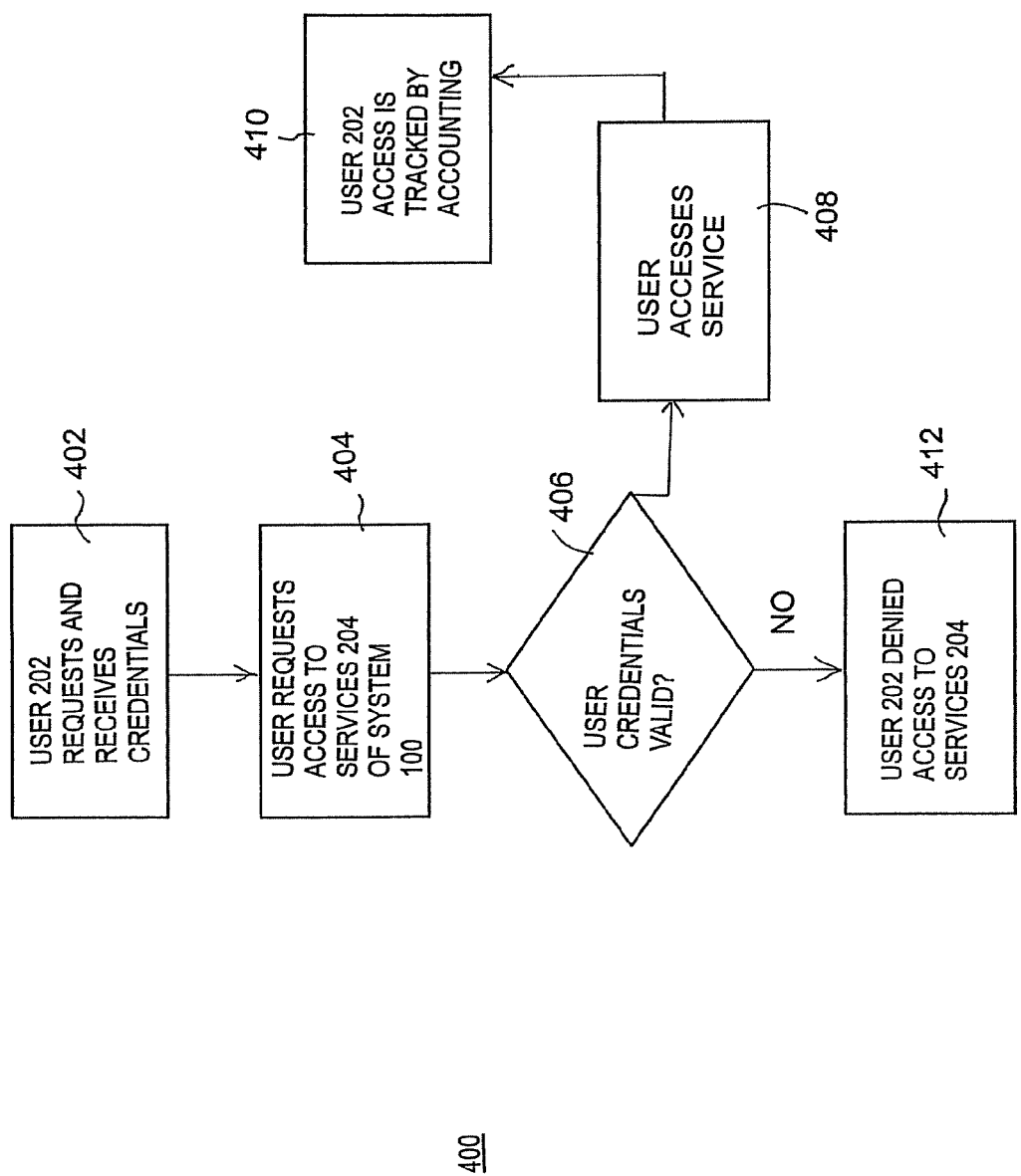
FIG. 4 shows a check-in/check-out scenario of the present invention.

A check-in/check-out scenario 400 is now presented, with reference to FIG. 4.

During check-in, the user 202 requests and receives 402 all of his credentials. If the credential to be used is a smart token, then this can be achieved by physically handing the smart token to the user 202. In the case of credentials such as certificates and shared keys, the check-in procedure would involve installing these on the client's device 112. This can be achieved by allowing the client 112 to access a wireless local area network (LAN), which gives the user 202 a web/UPnP interface (in the form of a service) to install the certificates and keys.

The user requests 404 access to services 204 of the system 100. While the credentials remain valid 406, the user 202 may access 408 the services 204 provided by the pervasive computer system 100, and this access is tracked 410 by an accounting function of the pervasive computer system 100.

While the client 112 is accessing 408 services 204, the user 202 experience again depends on whether the certificates/key mechanism or the smart token method is used. In the case of the smart token method, some user input (in terms of swiping, waving the smart card token, inserting the smart card in a slot or using a key pad/button), is required. The certificate/key mechanism is transparent as far as the user is concerned, other than the confirmation or warning message on the user's client device as in HTTPS.

Once the credentials expire 406 (based upon tracking 410 of the user 202 access to the services 204), then the user 202 is denied 412 access to services 204.

The check-in/check-out scenario provides minimal configuration experience, in which the user 202 can walk into any environment with minimal effort and be able to access the services 204 of the pervasive computer system 100.

Figure 5A:
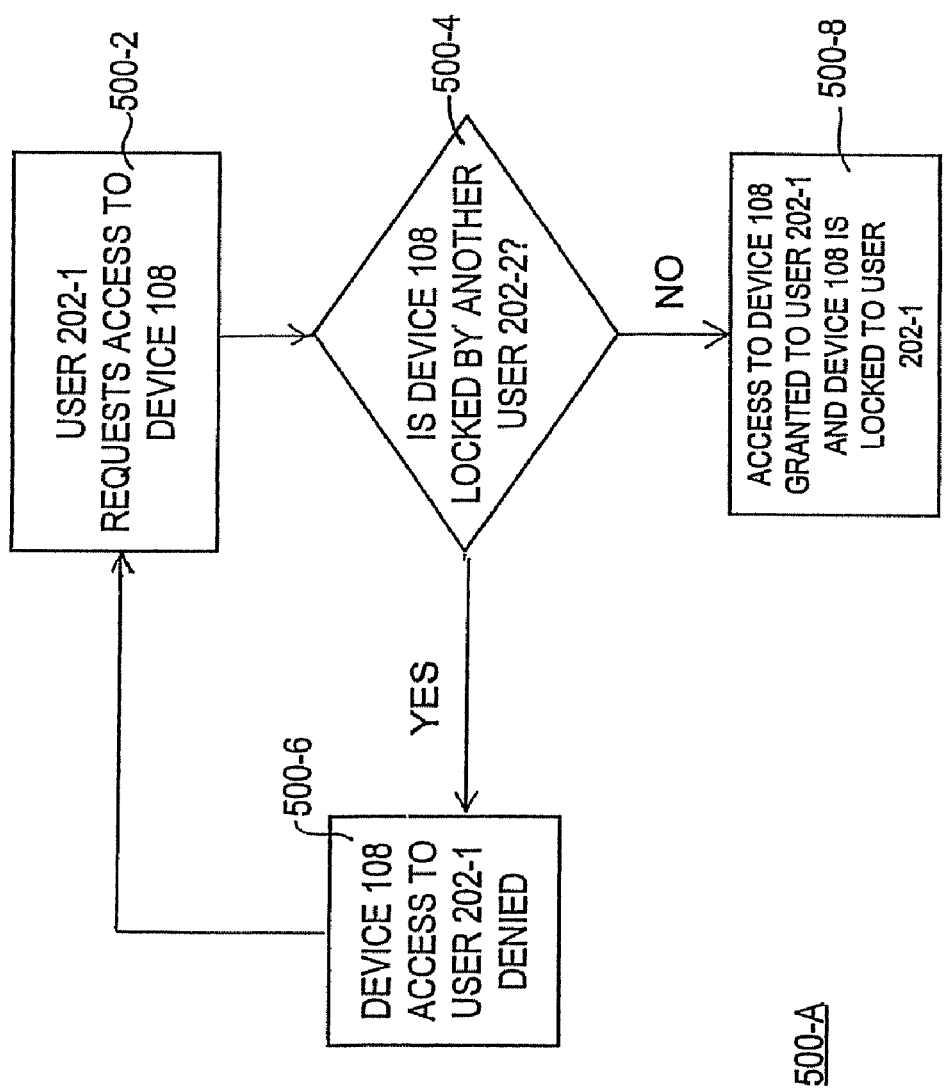
FIG. 5A shows a flowchart of the device lock function of the present invention.
Figure 5B:
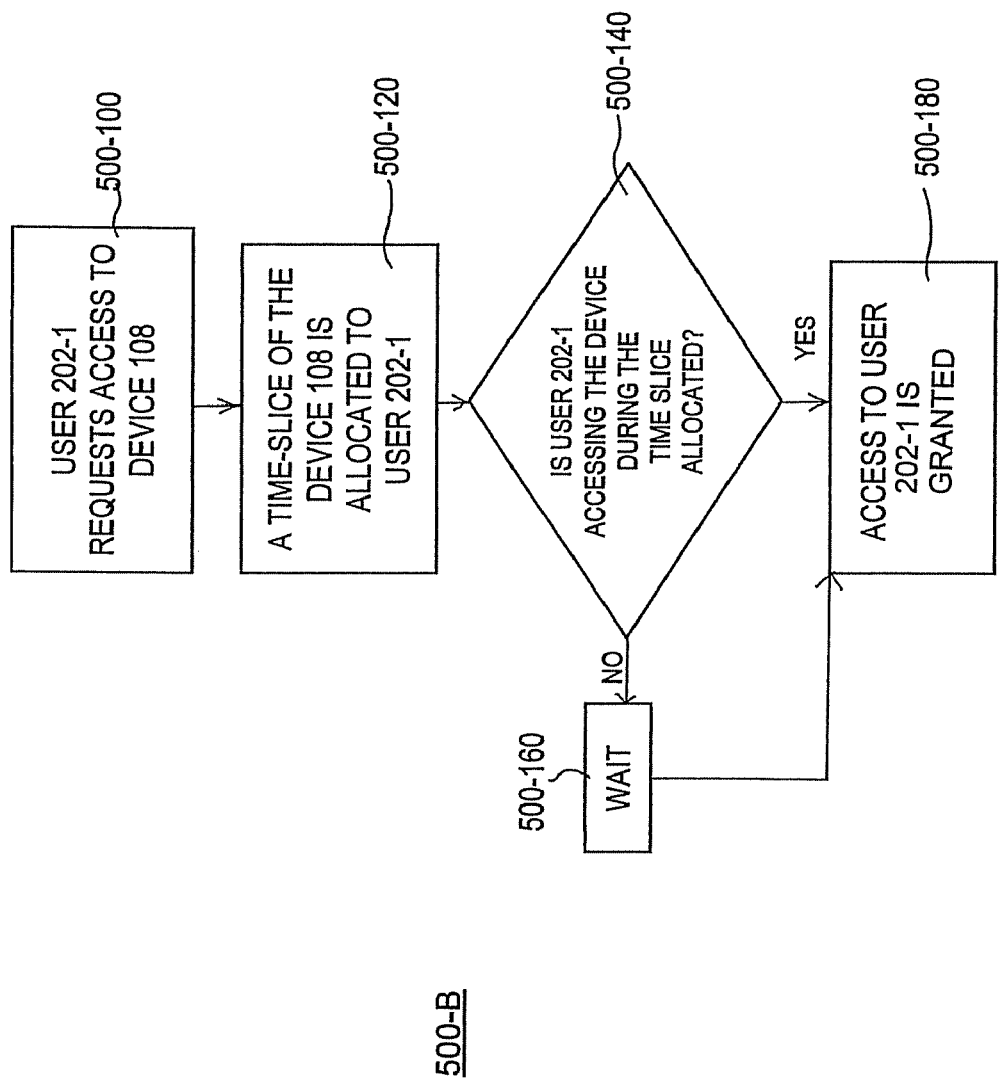
FIG. 5B shows a flowchart of the device scheduling function of the present invention.
Figure 5C:
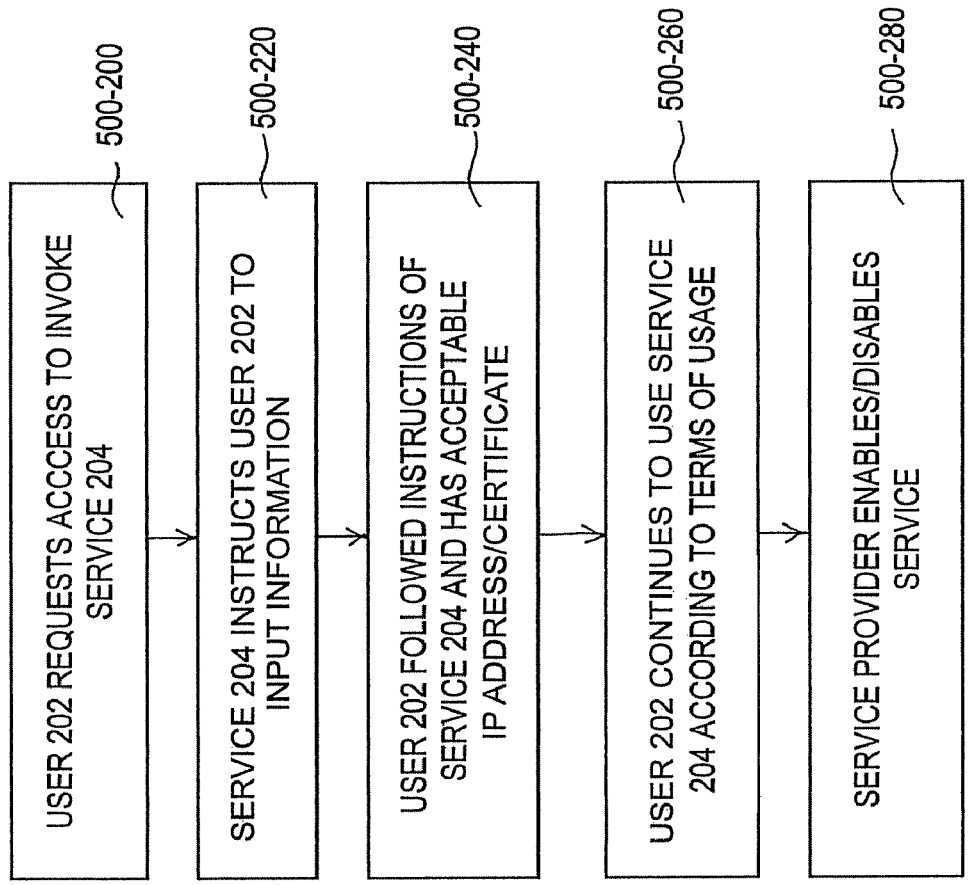
FIG. 5C shows a flowchart of the on-the-spot device schedule function of the present invention.

The device scheduling function 500 of the present invention is now explained, with reference to FIGS. 5A, 5B, and 5C.

Smart tokens as explained above, provide implicit networked service device 108 scheduling because of the property of constrained channels, which requires the users of the networked service device 108 (or service 204) to be in close proximity to the networked service device 108 (or service 204). Similarly explicit networked service device 108 (or service 204) access control can be enforced by the following: (1) device locks, (2) device scheduling, or (3) on-the-spot device scheduling. These access control functions (1), (2), and (3) can be invoked in the alternative or in combination with each other.

Device locks lock a service 204 provided on a networked service device 108 for one particular user 202 and prevent others from accessing the service 204 on the networked service device 108. That is, as long as one particular user 202 is accessing a service 204 on a networked service device 108, no other users 202 may access that same service 204 on that same networked service device 108.

FIG. 5A shows a flowchart 500-A of the device lock function of the present invention. As shown in FIG. 5A, a user 202-1 requests 500-2 access to a device 108/service 204. The device 108/service 204 then determines 500-4 the status of whether the device 108/service 204 is locked by another user 202-2. The device 108/service 204 then transmits to the user 202-1 (or the client device 112) the status of whether the device 108/service 204 is locked by another user 202-2. If the device 108/service 204 is locked by another user 202-2, then access is denied 500-6 the user 202-1 to the device 108/service. Alternatively, if the device is not locked by another user 202-2, then access to device 108/service is granted 500-8 to user 202-1 and user 202-1 locks the device to access by other users until user 202-1 has completed and relinquished access to the device 108/service 204.

Device scheduling, as in the case of time-shared operating systems, allows access to a device 108/service 204 by a user for a particular time slice after which the device 108 is provided to another user. Details are explained with reference to lease architecture herein below. A brief flowchart 500-B of device scheduling is shown in FIG. 5B.

FIG. 5B shows a flowchart 500-B of the device scheduling function of the present invention. As shown in FIG. 5B, a user 202-1 requests 500-100 access to device 108/service 204. A time slice of the device 108/service 204 is allocated 500-120 to user 202-1, if a time slice is available. If a time slice is not available, access to user 202-1 is denied. If the user 202-1 is not accessing the device 108/service 204 during the allocated time slice 500-140, then the user 202-1 must wait 500-160 for access 500-180. If the user 202-1 is accessing the device during the allocated time slice, then access to the device 108/service 204 is granted 500-180 to the user 202-1.

On-the-spot device scheduling provides device scheduling for potential users without the use of a previously obtained token.

The on-the-spot device scheduling function of the present invention is explained with reference to FIG. 5C.

FIG. 5C shows a flowchart 500-C of the on-the-spot device schedule function 500-C of the present invention.

The service 204 with its physical embodiment has an input device 114 (referred to as a keypad 114 in FIG. 1B, but also includes a button, numeric key pads, microphone, etc.), associated with it. When the user 202 requests access 500-200 to the service 204, the service 204 through communication with the networked service device 108/service 204 instructs 500-220 the user 202 (through the client device 112) to press the button, key in the PIN (Personal Identification Number) code or tell the PIN code to a microphone, etc. The service 204, for example, can give the user 202 the instructions through a web page if the service has a web page. Only after the user 202 follows the instructions can the user 202 start to use the service 204.

The user 202 can be identified by the IP (internet protocol) address of the user device 112 or the certificate if the user 202 is authenticated 500-240 for the service usage. The user 202 (identified by the IP address or certificate) can then continue 500-260 to use the service 204 according to terms of usage:

indefinitely, for a certain period of time, or for a certain number of its invocations. In the latter cases, the user 202 initially will be given a warning that the user's 202 time slice is about to expire in a short while, and the user 202 will eventually be asked to follow another instruction for the service invocation after that period of time or a certain number of invocations to continue. As long as the user 202 is in front of (physically) the networked service device 108/service 204 and the associated input device 114, as a practical matter, other users are prevented from using the service 204. The user 202 can have the exclusive use of the networked service device 108/service 204 as long as the user 202 in front of the networked service device 108/service 204.

In one embodiment of the present invention, the service provider can key-in a special code to disable 500-260 the service 204 until some user 202 comes (physically) in front of the service 204 to follow the directions. This mechanism provides a way to prevent the user 202 from using the service 204 after user 202 has left the site of the service 204 or networked service device 108 providing the service 204. The service provider can also key-in another special code to disable 500-260 the lock to let the user 202 freely user the service 204.

Moreover, the authenticated biometrics (such as finger prints) can be downloaded to the networked service device 108 from a server 204 on which the authenticated biometrics are stored, and checked against the user 202 by the networked service device on the spot.

In addition, this mechanism can be employed to make the service 204 a pay service. When the service 204 invoked, the service 204 asks the user 202 to deposit some money 500-220 or to swipe the user's credit card 500-220 for usage of the service. The user (identified by the IP address or certificate) can continue to use the service for a certain period of time or for a number of its invocations. The PIN or some other message is sent back to the service through the channels with limited ranges other than the original channel which the PIN or the message is sent to the user. The channels with limited ranges include physical user interactions, Bluetooth, infrared, etc.

On-the-spot device scheduling is particularly useful for the pervasive services in public places. This provides a simple and sufficient solution for such services as Internet Kiosk, Map Viewer, Map Router, Print, and others.

Figure 5D:
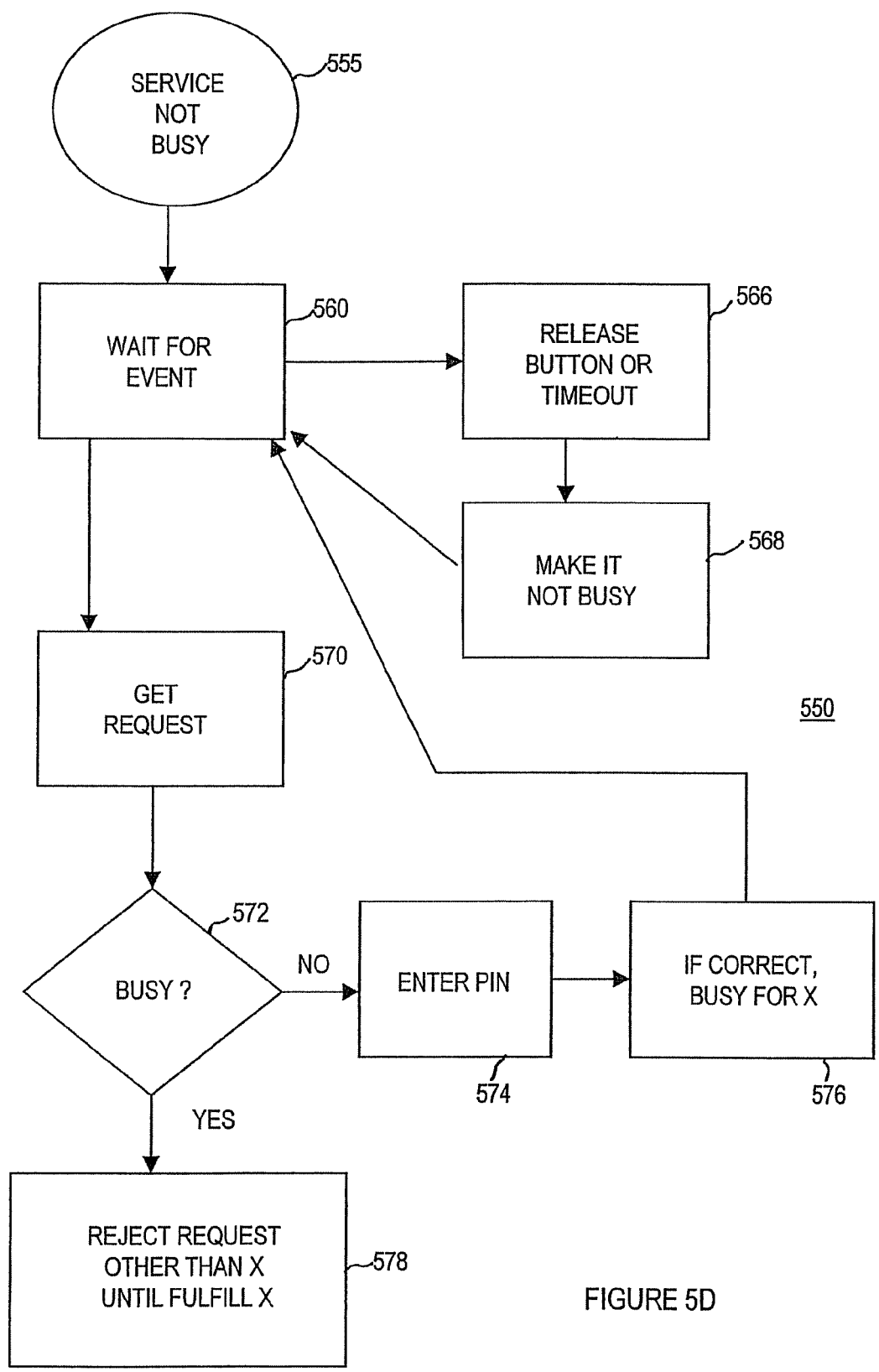
FIG. 5D shows a flowchart of invoking a service having a time out or release button of the present invention.

FIG. 5D shows a flowchart of invoking 550 a service with a time out or release button, of the present invention.

As shown in FIG. 5D, the service 204 is initially set 555 to "not busy", and the service 204 waits 560 for an event. If the event is the pressing 566 of a release button (attached as input device 114 to networked service device 108 embodying the service 204) or a timeout (there has been no input to the service 204 for a specified time period, such as 5 minutes, 30 minutes, etc) 566, then the service 204 is made 568 "not busy", and control returns to wait 560 for an event. If the event is to get request 570, then a query is made to determine 572 whether the service 204 is busy. If the service 204 is not busy, then the user (i.e., user X) enters 574 a PIN, and if the PIN is correct 576, the service is made "busy" for user X. If the service 204 is busy, then the service rejects 578 requests from users other than user X until user X's requests are fulfilled (until user X finishes invoking the service 204).

The service 204 may, or may not, continue to allocate PINs to user's other than the current user A of the service 24 while user A is invoking the service, to form a queue of PINs/subsequent users of the service 204.

Figure 5E:
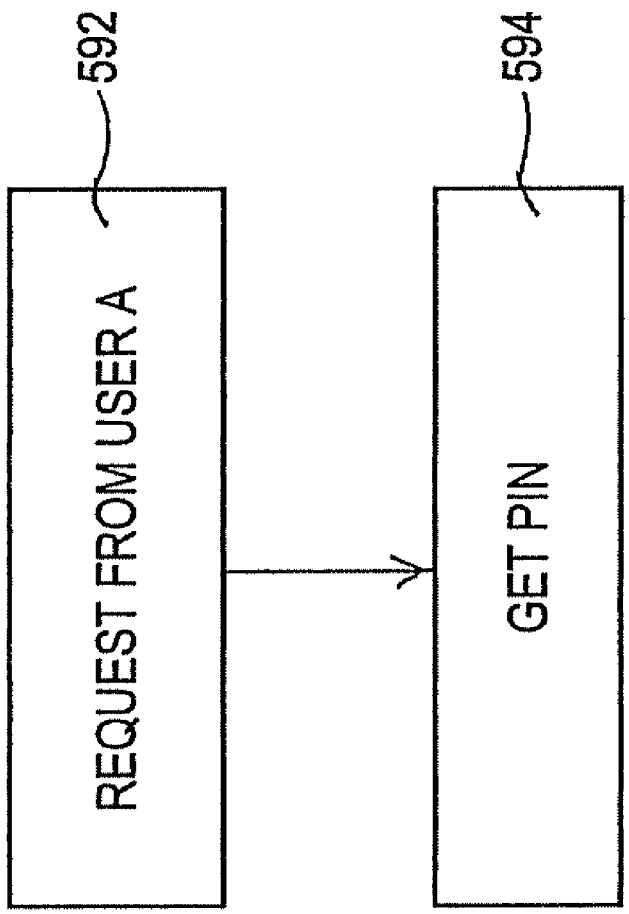
FIG. 5E shows a flowchart of getting a PIN in the present invention.

FIG. 5E shows a flowchart 590 of a receiving a request for a PIN. As shown in FIG. 5E, the service 204 receives 592 a request from user A, then gets 594 the PIN for user A.

The following is a usage scenario:

A Public Display Kiosk that will display information for users with client devices such as small PDAs or cell phones that have limited displays. The Public Display Kiosk can be used for web pages or other applications that require larger display areas to be useful. The Public Display Kiosk is connected to a LAN that also has an access point providing wireless LAN capability. The Public Display Kiosk has a numeric key pad 114 connected to the display device 108 that provides the display service.

A user 202 with a user's client 212 comes close to the Public Display Kiosk. The client device is assumed to have wireless LAN capability.

The user 202 will discover the Public Display Kiosk service through invoking a service discovery protocol on the client device in communication with the WLAN. The user will select the "Public Display Kiosk" service and attempt to invoke the service through a function on the client device. This will communicate with the server that implements the "Public Display Kiosk" service. The server will return a PIN to the client device that is used to enable the device. The user waits until the Public Display Kiosk is free. The user then types the PIN into the Keypad attached to the Public Kiosk Display. If the PIN is correct, then the user is granted access to the "Public Display Kiosk Service" and can proceed to control the display through the client device.

More specifically, when the user 202 invokes 500-200 the Public Display Kiosk service 204, the message "Please key in 9357 to access the service" appears 500-220 in the control page for the Public Display Kiosk.

Figure 6:
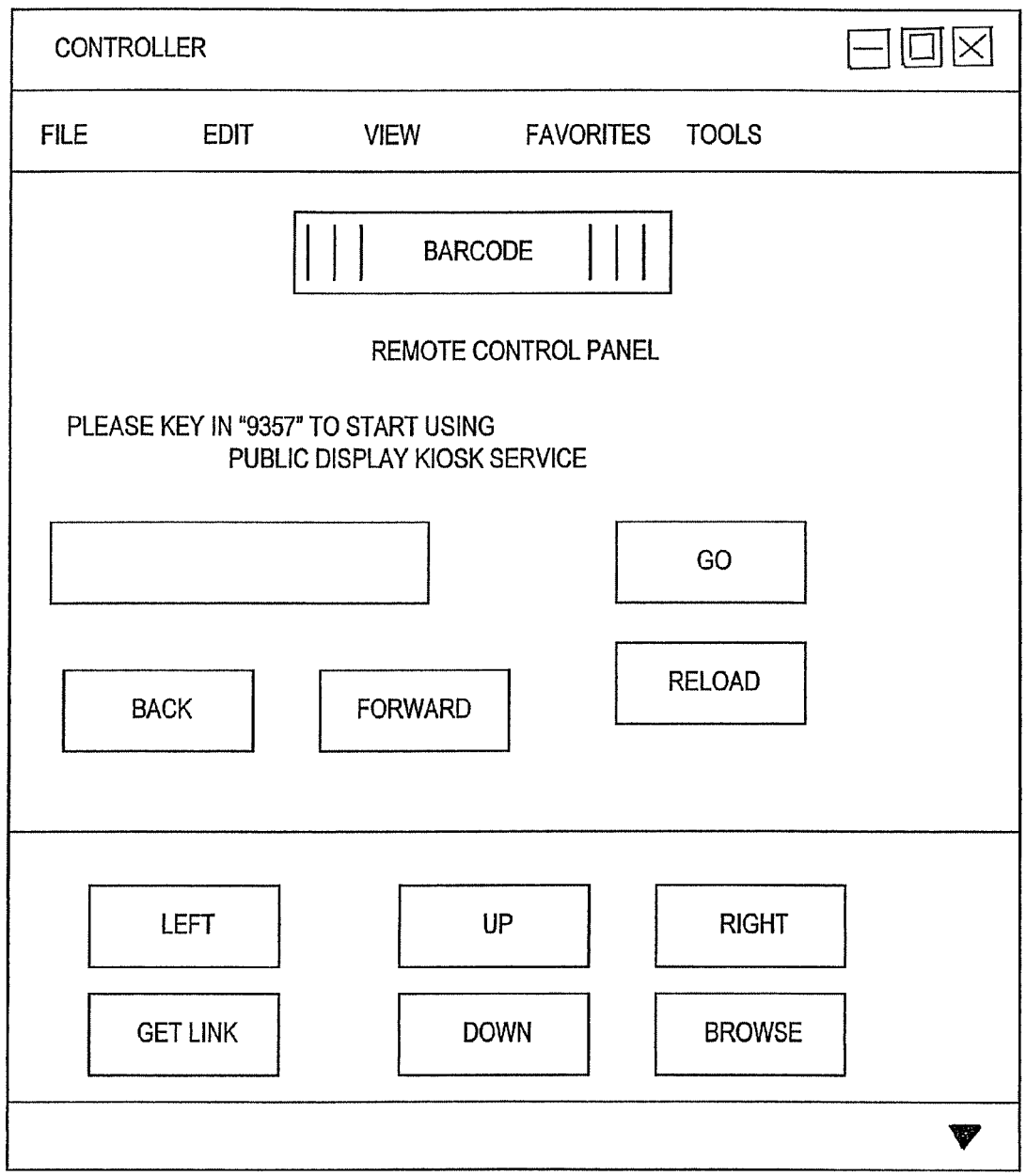
FIG. 6 shows an example of a control page of the present invention.

FIG. 6 shows an example of a control page 600 of the Public Display Kiosk, which includes a computer including a display and an input device such as a keypad or a keyboard. This control page 600 is presented to the user by an Internet browser, such as MICROSOFT INTERNET EXPLORER®, and is presented on the display of a user's client device 112.

As shown in FIG. 6, the control page 600 instructs the user to key in the PIN 9357 to start using the service 204. Once the PIN 9357 is keyed into the control page 600, then the Public Display Kiosk service 204 is accessible to the user 202.

Only after the user 202 keys in that PIN 500-24, the user 202 can use the service 204.

Alternatively, when the control page 600 is to be displayed on the user's client device 112, then instead of a PIN, or in addition to a PIN, a barcode could be displayed on the control page 600.

For a while the user 202 continues 500-26 to use the Public Display Kiosk service 204 without being disturbed since the other users cannot key in the PIN presented to them even if they try to invoke the service 204.

After the current user 202 has left the Public Display Kiosk another user can access the Public Display Kiosk by typing in a valid PIN.

A service administrator can be employed to observe the networked service device. If the service administrator notices that the service 204 is still being used remotely, but there is no user physically present, then, the service administrator keys in "0000" to prevent 500-28 the user 202 (and any other user) from using the service 204 until some other user comes in front of the service 204 to key in the PIN presented for that user 202 to use the service 204.

In an embodiment of the present invention, such as in the office environment, network security and physical security are combined in the present invention. The user 202 needs to be physically in front of the device 108 to key in the PIN to use the service 204 as well as being authorized for being on the network 102.

An embodiment of the present invention of on-the-spot scheduling which includes implementation using a URL Viewer Queue is now presented.

In this section, a description of how the on-the-spot device scheduling can be implemented using the request queues of a URL viewer service is presented. The URL view service may be executed on a networked service device 108. The same implementation can be applied to other pervasive services such as Map viewer and router services.

DEFINITIONS

SR-PIN: Security Release PIN (default: "9999")
SE-PIN: Security Enforcement PIN (default: "0000")
C-PIN: Current PIN
C-U: Current User identified by IP address, through the user's certificate, or any other method PIN's are usually set to a fixed length (ex. 4-digit) for the user's convenience (to fit the user's preconception of PIN's and for less mistakes.). However, PINs do not necessarily have to be a fixed length.

There are two modes for the queue:
Security Released Mode
Security Enforced Mode A flowchart 700 of implementation of on-the-spot scheduling of the present invention using a URL Viewer Queue is explained with reference to FIG. 7.

Figure 7:
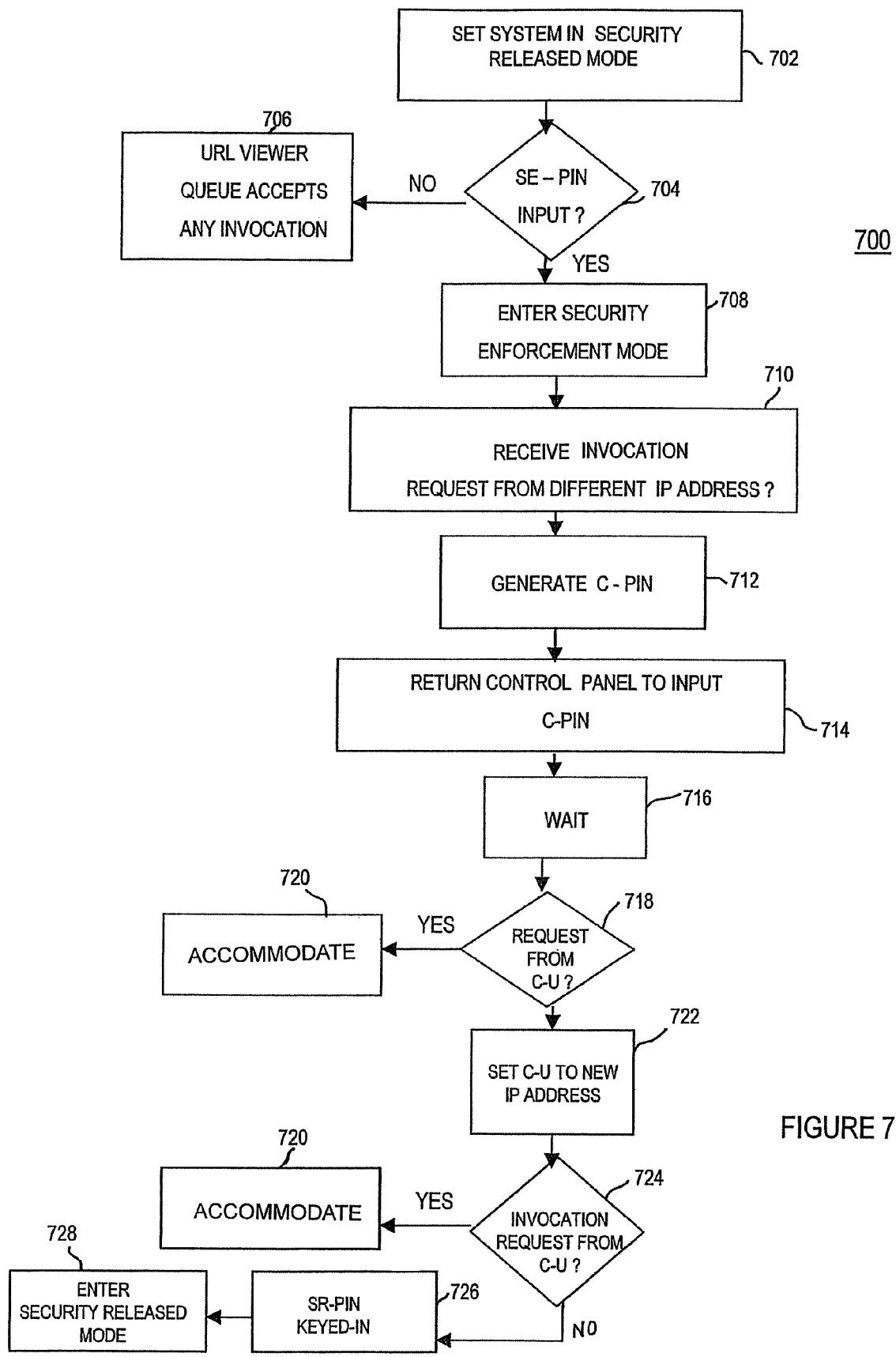
FIG. 7 shows an example of implementation of on-the-spot scheduling of the present invention using a URL Viewer Queue.

Referring now to FIG. 7, initially, the system 100 is set 702 in the Security Released Mode. For the Security Released Mode, The URL viewer will accept 706 any invocation.

All PIN input is ignored except SE-PIN. When SE-PIN is input 704, the Security Enforcement Mode is entered 708.

For the Security Enforcement Mode,

When the invocation request is received 710 from an IP address different from C-U, Generate 712 C-PIN C-PIN can be generated randomly, from IP address of the user device (and IP address of the service device), from some attributes of the user, or any other method that is reasonably specific to the user or the user device.

Return 714 the control panel 800 with the message to input the C-PIN.

Figure 8:
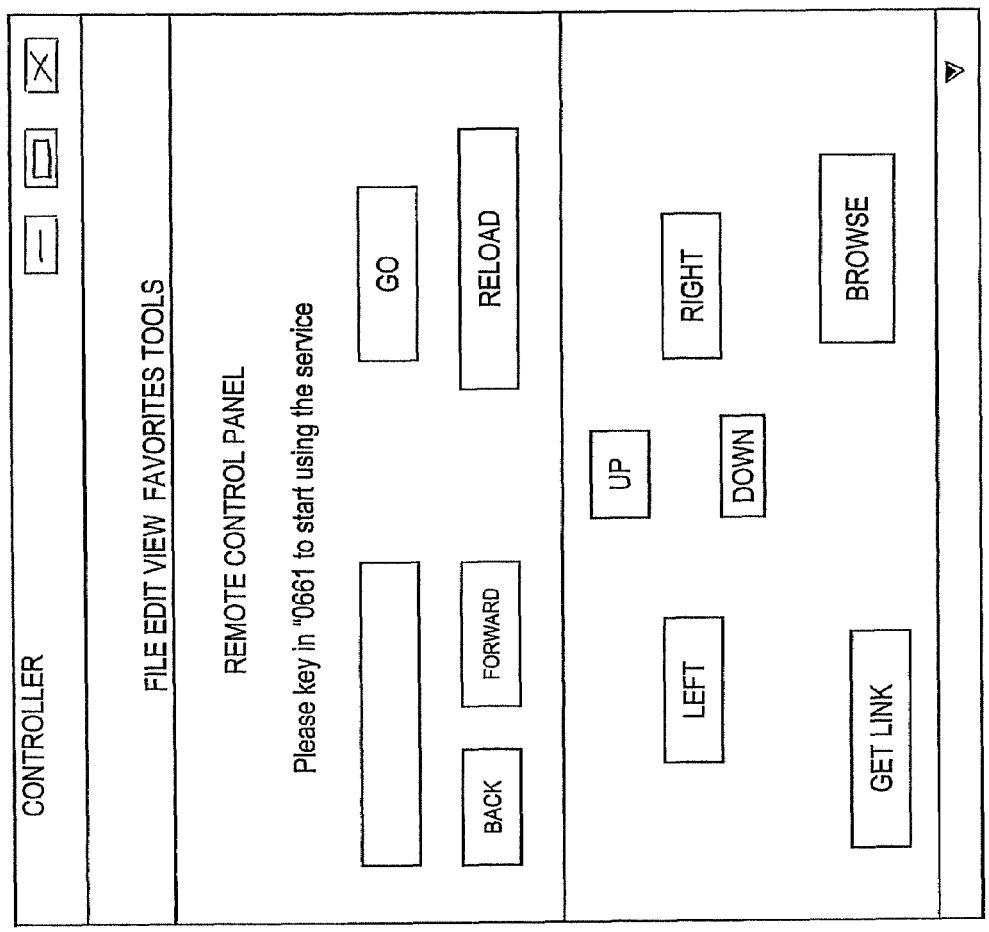
FIG. 8 shows another example of a control page of the present invention.

An example of such a control panel 800 is shown in FIG. 8 with the message "Please key in '0661' to start using the service". This control panel 800 is presented to the user on a display by an Internet browser, such as MICROSOFT INTERNET EXPLORER®, and could be presented on a display of a networked service device 108.

Wait 716 for the set period of time (default: one minute) to see if the C-PIN is keyed in.

If the C-PIN is keyed in during that period, set 722 C-U to the new IP address and accommodate the request 720.

Before the C-PIN is keyed in and if there is a request 718 from C-U, then accommodate 720 the request.

When the invocation request 724 comes from C-U, accommodate 720 the request.

If the SR-PIN is keyed in 726, enter 728 the Security Released Mode.

Security Through Location Determination is now explained.

The server-side 104 location determination of the client 112 can serve as another way to improve security. Triangulation or beacon technologies can determine the location of a WLAN client 112, for example. The service 204 can contact the location determination server (one of the servers 104) to determine whether the client 112 accessing the service 204 is really within the acceptable range of the service 204. For the location determination, tracing the route back to the IP address of the client 112 or determining which WLAN access point 110 the client 112 is using can serve as the location determination technologies for the present invention. For the Bluetooth or IR (Infra-red) cases, the fact that the user 112 can communicate with the device 108/110 serves as the basis for the security due to their inherent short communication range.

Figure 9:
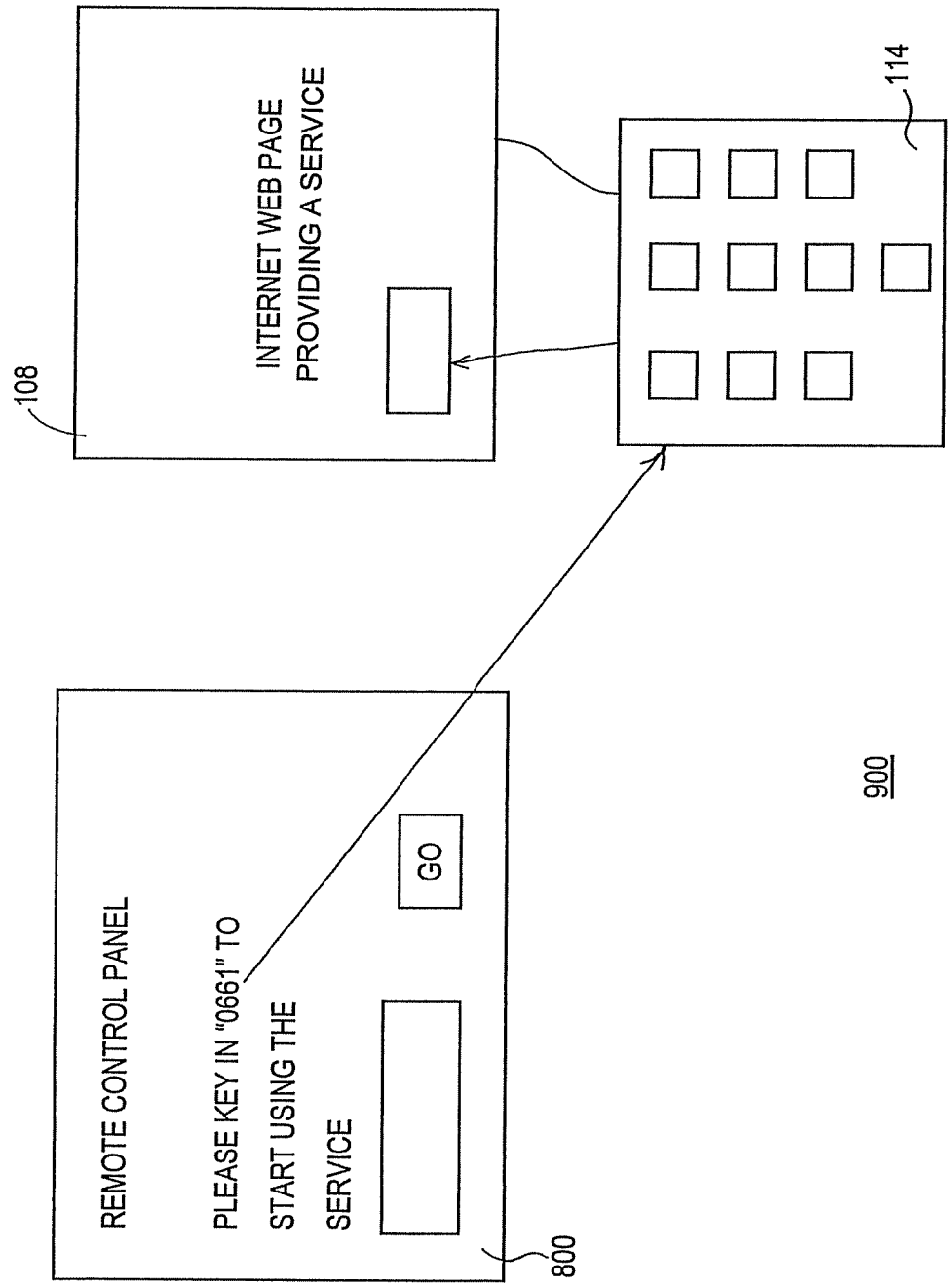
FIG. 9 shows a relationship between a control page of the present invention, an input device, and a service.

FIG. 9 shows a relationship between a control page 800 displayed on the user's client device 112 of the present invention, an input device 114 coupled to a networked service device 108, and a service 204 being provided by the networked service device 108. In the example of FIG. 9, the service 204 is an Internet web page providing a service. As shown in FIG. 9, the user is prompted by a control page 800 to key in PIN "0661" to begin using the service. The control page 800 could be a pop-up window displayed on the user's client device 112. Once the user reads the PIN off of the control page 800 and keys the PIN into the keypad 114 coupled to the networked service device 108, the service 204 is invoked and user then uses the service 204 provided by the networked service device 108, such as Internet browsing, without interruption. The user must be physically present at the input device 114 to key in the PIN.

An embodiment of the lease architecture function of the present invention is now explained with reference to FIG. 10.

Figure 10:
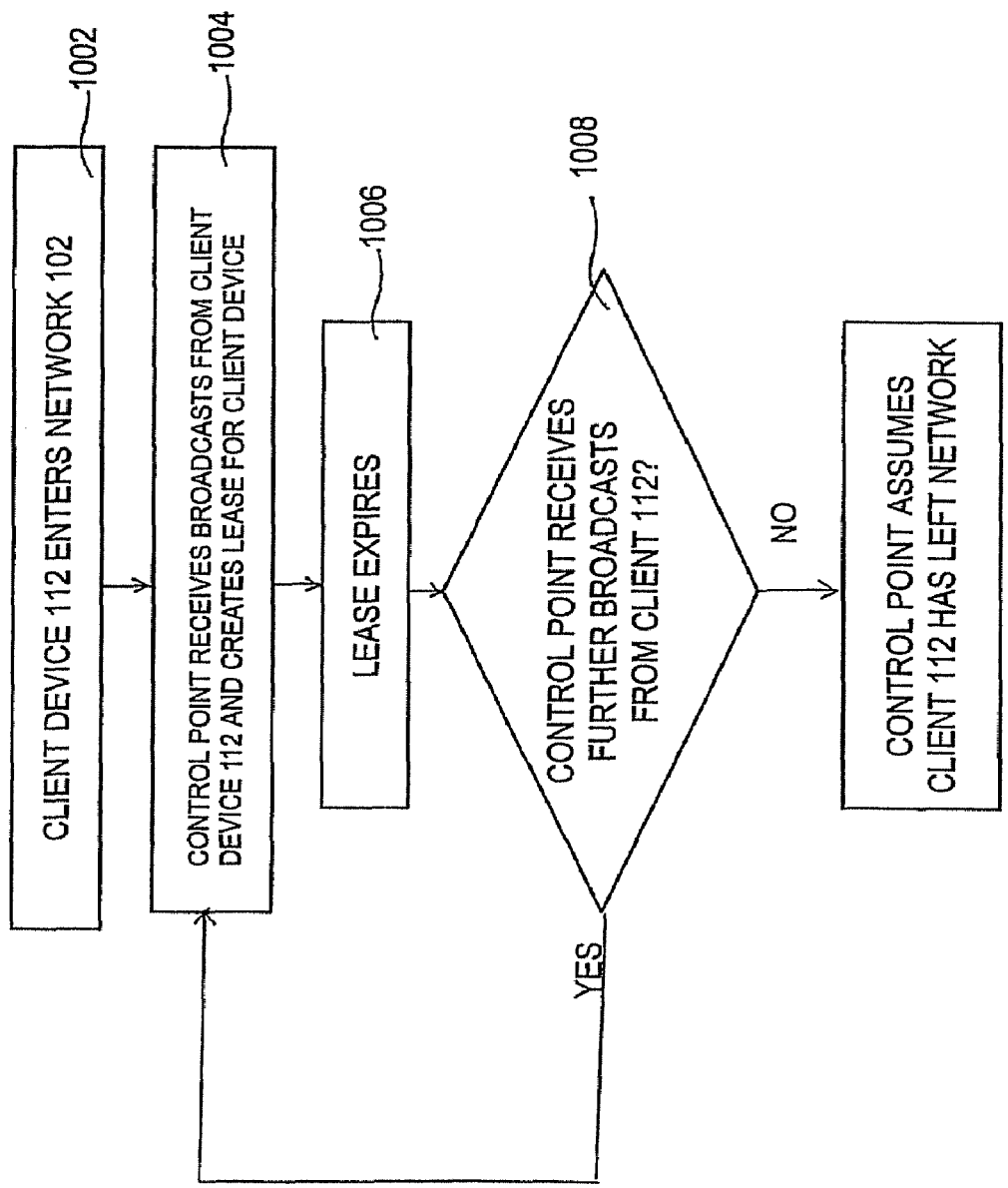
FIG. 10 shows a flowchart of the lease architecture function of the present invention.

FIG. 10 shows a flowchart 1000 of the lease architecture function of the present invention.

When a client device 112 comes 1002 into a UPnP network 102, or a control point (which in UPnP controls devices and finds services) is turned on, there is a flurry of UPnP activity as the control point becomes aware of devices in the network 102. The control point receives 1004 broadcasts from client devices 112 and creates a lease for each client device 112 for a certain amount of time. A lease can be in terms of a time period, number of invocations of a service etc. This time period is often 15-30 minutes. This is the amount of time the client device 112 is legally in the network. When the lease expires 1006, if the control point does not hear 1008 any more broadcasts from the device 112 (and did not receive a goodbye message) the control point assumes that the client device 112 has left 1010 the network 102. On the other hand, if the control point does hear back from the device 112, the lease for the device 112 is renewed and the device 112 continues on in the network 102, returning to operation 1004.

Having a lease-based architecture in some form would allow for control of access to services as well as any physical device, like a keypad, and can allow for other higher level security features to be built on top.

An example of the lease architecture would be when someone wants to show something on a networked service device 108 such as a projector that is one of the services 204 provided by the network 102. Without such a lease architecture, if a user 202 (or client device) having an IP address/certificate takes control of and projects an image from the projector, then as soon as the request completes, the projector could be invoked by another user and whatever had been showing on the screen onto which the projector is projecting the image would be overwritten by the next user.

But if the projector had given the user (client device 112 IP address/certificate) a lease when the user had invoked the service of the projector, offering control of the projector for a certain amount of time, this situation could have been avoided. Single user devices 108 like the projector would give out one lease at a time. As long as the single user devices 108 have provided an active lease, the single user devices are not able to be invoked by another service. This prevents other users from putting up their material on the projector. Also, it would prevent control by any user but the user holding the lease, so a user who has access to the control panel of the projector could not manipulate another user's slide show. That is, only the lease would have the power to do so.

Devices or services such as any of the information providers who merely provide content, and have no implicit restrictions on who can use the device and at what time, would either assign very short duration leases, or would not block others from invoking the service if there were still pending leases.

The procedure to get a lease for a device could be made as complicated or as simple as needed, depending upon the levels of security built in.

The above-mentioned lease architecture is also applicable to a special client system, an example of which includes the STEER browser, explained in the above-mentioned TASK COMPUTING patent applications (U.S. Provisional Patent Application No. 60/434,432, filed Dec. 19, 2002 U.S. Provisional Patent Application No. 60/501,012, filed Sep. 9, 2003, U.S. Provisional Patent Application No. 60/511,741, filed Oct. 17, 2003, and U.S. patent application Ser. No. 10/733,328, filed Dec. 12, 2003 in the U.S. Patent and Trademark Office, the contents of all of which are incorporated by reference).

A basic approach of the lease architecture system would be to issue leases to whomever requests them. That is, any user operating the special client (such as STEER) or any UPnP control point can manipulate the services available from the network 102.

A first level of security would be to only issue leases to someone who proves they are executing particular software, such as the special client (such as the STEER browser), and not some outside program.

A next level of security would be more complex, and would require signed certificates, bio-information, or another security scheme.

These levels of security could be combined with each other.

In order to deal with the situations where the user with remaining lease time has left the service without releasing the lease, some additional mechanisms can be incorporated.

One of these mechanisms to make the lease auto-expire after a short period of inactivity of the same user. This mechanism can be further refined by automatically extending the lease each time the user uses the service.

Alternatively, a maximum number of leases (usually one) can be set on the user side at the same time. When the user invokes another and gets a new lease for that service, the old lease it still had open would be invalidated, freeing up the previous service. Also, when the special client shuts down, any currently open leases would be invalidated.

Figure 11:
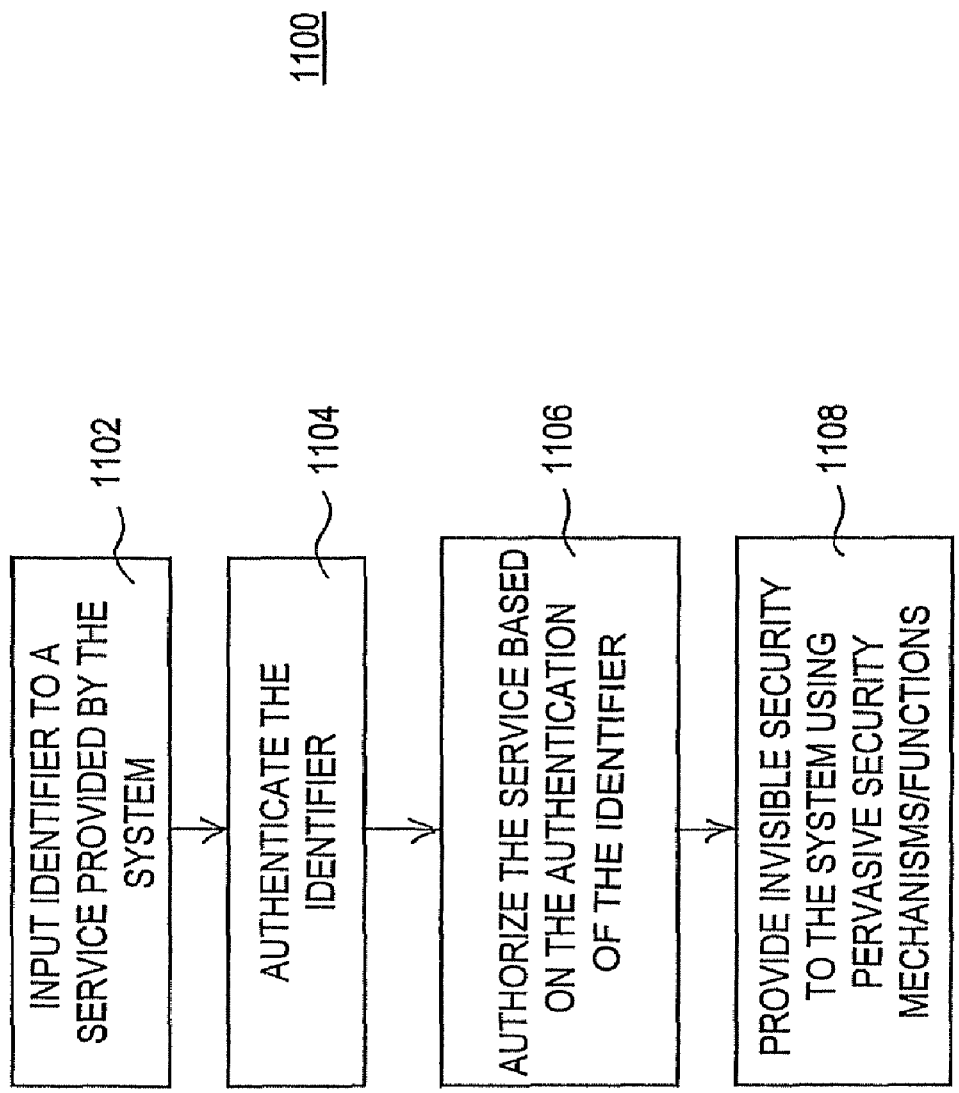
FIG. 11 shows a flowchart of an overview of the present invention.

FIG. 11 shows a flowchart 1100 of an overview of the present invention. In the present invention, a user 202 inputs 1102 an identifier to a service 204 provided by a pervasive computer system 100. The user 202 inputs the identifier using a client device 112 or directly into a networked service device 108 using an input 114 attached to the networked service device 108. This identifier could be a PIN, a biometric identifier, a smart token, etc. The service 204 then authenticates 1104 the user 202, and authorizes 1106 the use of the service 204 based on the authentication of the identifier by the service 204. This authentication and authorization is performed at the embodiment of the service 204, such as by the networked service device 108. The present invention then continues to provide 1108 invisible (minimal user actions) security to the system 100 using pervasive security functions discussed herein above, such as check-in/check-out functions, device scheduling, leasing, etc.

Additional Security Considerations

The access to a device or service is predominantly network based access augmented by simple physical access control. This is a model of a dual yet easy to use access control framework.

For physical access control, the use of a PIN or a smart token can give a user both infinite access to the device or service or fixed time slices where access is given.

Another aspect is the case in which after physical access control, a user walks away from the device before his time slice is over. This allows another user to view the service but does not provide any extra features to other users. This is closely tied with most service access being predominantly network based. For example, suppose a user is allowed access to a map service using this dual access control model and the user is given a time slice of 20 seconds but the user finishes viewing his map of in 5 seconds and walks away. If another user comes in front of the device showing the map, he can view the map but he cannot invoke or control (zoom, or move) any other map (for which he has to go through the dual access control model again).

The present invention provides mechanisms for access control, authorization and authentication in the pervasive computing environment, an example of which is TASK COMPUTING (described in U.S. Provisional Patent Application No. 60/434,432, filed Dec. 19, 2002 U.S. Provisional Patent Application No. 60/501,012, filed Sep. 9, 2003, U.S. Provisional Patent Application No. 60/511,741, filed Oct. 17, 2003, and U.S. patent application Ser. No. 10/733,328, filed Dec. 12, 2003 in the U.S. Patent and Trademark Office, the contents of all of which are incorporated by reference).

The present invention provides for secure use of pervasive services, with features including:

Check-in, Check-out Security Procedure Pervasive Services

Lease-based service usage model

Service/Device Access using associated input device

On-the-spot service/device scheduling function and an embodiment

Enhanced security through physical location

Embodiment of Check-in, Check-out security in the TASK COMPUTING environment and STEER browser, as discussed herein above.

The present invention provides convenience to the users by making network interfaces for the services and networked service devices convenient. Users can use the devices to which the users are accustomed. The present invention takes advantage of the physical embodiments of devices and thus makes it convenient for the user to access a network from any place. In one embodiment of the present invention, the user is required to be on the spot to be granted authorization to operate the device. No prior arrangement between the user and the device is required for the PIN mechanism of the present invention, which is particularly advantageous for, by way of example, information kiosks located in public and semi-public environments such as malls, parks, libraries, museums, offices, etc.

In addition, with the pervasive security mechanism of the present invention, anonymity of the user is preserved.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of providing pervasive security by a combination of physical interfaces and network interfaces to a service to a user, comprising:
   establishing by the user's client device network connectivity to the service;
   generating and transmitting by the service a check-in phase credential to the user's client device, in response to the connectivity to the service;
   determining by the service whether the user enters the generated check-in phase credential into the service in physical proximity to the service; and
   invoking the service if the user has entered the generated check-in phase credential into the service in physical proximity to the service,
   wherein the determining by the service determines whether the service is locked by another checked-in user and denies access of the service to the user if the service is locked by another user.

2. The method as in claim 1, wherein the determining by the service comprises determining by the service whether the entered check-in phase credential of the user's client device is valid.

3. The method as in claim 2, wherein the entered check-in phase credential comprises one or more of a bar code, a PIN, a pass phrase, a lease, a certificate, a key, and a biometric identifier.

4. The method as in claim 3, wherein the biometric identifier comprising at least one of a fingerprint, an iris scan, vein identification, and facial identification.

5. The method as in claim 2, wherein the check-in phase credential is provided to the user's client device by the service upon check-in by the user's client device to the network and is revoked by the network upon check-out from the service.

6. The method as in claim 2, wherein the user's client device is denied access to the service if the check-in credential is not valid.

7. The method as in claim 2, wherein the accesses by the user to the service are tracked by the service.

8. The method as in claim 1, further comprising allocating a time slice of the service to the user's client device if the user's client device is permitted access to the service.

9. The method as in claim 1, further comprising issuing by the service to the user's client device a lease for usage of the service.

10. The method as in claim 9, wherein the lease is valid for the duration of usage by the user's client device.

11. The method as in claim 10, wherein the lease is valid for a fixed duration.

12. The method as in claim 9, wherein the lease is renewable by continued usage by the user's client device.

13. The method as in claim 1, further comprising instructing by the service to the user's client device input of information to enable usage of the service by the user's client device.

14. The method as in 13, wherein the usage of the service by the user's client device is unrestricted once the information is input.

15. The method as in claim 9, wherein the service comprising use of a networked service device for displaying information.

16. The method as in claim 15, wherein the displaying comprising display information on a computer screen.

17. The method as in claim 15, wherein the displaying comprising displaying information by a projector.

18. The method as in claim 17, wherein the information comprising a map.

19. The method as in claim 15, further comprising printing the information on a printer.

20. The method as in claim 1, further comprising providing service-level security to the pervasive computer system, the service-level security comprising a security released mode in which the service will accept and provide service to any IP address invoking the service, and a security enforcement mode in which the service will accept and provide service based upon the input of a valid identifier related to the IP address of the client device.

21. The method as in claim 1, wherein the determining by the service comprising determining whether a user is in physical proximity to the service by requiring input of a generated check-in phase PIN as the generated check-in phase credential on an input device coupled to a networked service device providing the service.

22. The method of claim 1, wherein the invoking of the service provides a control panel function for the service on the client's user device permitting access to the service.

23. The method of claim 1, further comprising providing a physical embodiment of the service by one of more servers and one or more networked service devices.

24. The method of claim 1, further comprising:
   requesting, by the client device, the service,
   sending, by the service, a generated check-in phase PIN to the client device as the generated check-in phase credential,
   inputting, by the user operator of the client device, the generated check-in phase PIN into an input device for the service in physical proximity to the service,
   sending, by the service, a control page to the client device, and
   accessing, by the user, the service through the client device.

25. A computer-readable medium storing a program which when executed by a computer, causes the computer to provide pervasive security by a combination of network and physical interfaces to a service to a user including the functions comprising:
   establishing by the user's client device network connectivity to the service;
   generating and transmitting by the service a check-in phase credential to the user's client device, in response to the connectivity to the service;
   determining by the service whether the user enters the generated check-in phase credential into the service in physical proximity to the service; and
   invoking the service if the user has entered the generated check-in phase credential into the service in physical proximity to the service, wherein the determining by the service determines whether the service is locked by another checked-in user and denies access of the service to the user if the service is locked by another user.

26. The medium as in claim 25, wherein the determining by the service comprises determining by the service whether the entered check-in phase credential of the user's client device is valid.

27. The medium as in claim 26, wherein the entered check-in phase credential comprises one or more of a bar code, a PIN, a pass phrase, a lease, a certificate, a key, and a biometric identifier.

28. The medium as in claim 27, wherein the biometric identifier comprising at least one of a fingerprint, an iris scan, vein identification, and facial identification.

29. The medium as in claim 26, wherein the check-in phase credential is provided to the user's client device by the service upon check-in by the user's client device to the service, and is revoked by the pervasive security network upon check-out from the service.

30. The medium as in claim 26, wherein the user's client device is denied access to the service if the check-in credential is not valid.

31. The medium as in claim 26, wherein the accesses by the user to the service are tracked by the service.

32. The medium as in claim 25, further comprising allocating a time slice of the service to the user's client device if the user's client device is permitted access to the service.

33. The medium as in claim 25, further comprising issuing by the service to the user's client device a lease for usage of the service.

34. The medium as in claim 33, wherein the lease is valid for the duration of usage by the user's client device.

35. The medium as in claim 34, wherein the lease is valid for a fixed duration.

36. The medium as in claim 33, wherein the lease is renewable by continued usage by the user's client device.

37. The medium as in claim 25, further comprising instructing by the service to the user's client device input of information to enable usage of the service by the user's client device.

38. The medium as in claim 37 wherein the usage of the service by the user's client device is unrestricted once the information is input.

39. The medium as in claim 33, wherein the service comprising displaying information.

40. The medium as in claim 39, wherein the displaying comprising display information on a computer screen.

41. The medium as in claim 39, wherein the displaying comprising displaying information by a projector.

42. The medium as in claim 41, wherein the information comprising a map.

43. The medium as in claim 39, further comprising printing the information on a printer.

44. The medium as in claim 25, further comprising providing service-level security to the pervasive computer system, the service-level security comprising a security released mode in which the service will accept and provide service to any IP address invoking the service, and a security enforcement mode in which the service will accept and provide service based upon the input of a valid identifier.

45. The medium as in claim 25, wherein the determining by the service comprising determining whether a user is in physical proximity to the service by requiring input of a generated PIN as the generated check-in phase credential on an input device coupled to a networked service device providing the service.

46. A pervasive computer system providing a service, comprising:
   mean for determining whether the service is locked by another user and denying access of the service to the user if the service is locked by another user;
   means for inputting a check-in phase credential to a service in physical proximity to the service;
   means for authenticating the check-in phase credential;
   means for authorizing use of the service based on the authentication of the check-in phase credential; and
   means for providing invisible security to the pervasive computer system using at least one of a check-in/check-out function and a leasing function.

47. The system as in claim 46, wherein the means for inputting comprising at least one of a keypad, keyboard, and biometric input.

48. The system as in claim 46, wherein the check-in phase credential comprises one or more of a key, a certificate, a PIN, a pass phrase, and smart token.

49. The system as in claim 46, wherein the means for authenticating comprising authenticating the check-in phase credential by the service prior to the service being invoked.

50. The system as in claim 46, wherein the means for authorizing comprising authorizing by the service the use of the service by a user corresponding to the check-in phase credential prior to invoking the service.

51. The system as in claim 46, wherein the means for providing invisible security comprising check-in/check-out, lease architecture, and device scheduling.

52. The method as in claim 1, further comprising:
   establishing, by the user's client device, connectivity to the networked service;
   interacting, by the user's client device, with the networked service;
   accepting, by the user's client device, commands from the user; and
   communicating, by the user's client device, to the user the check-in phase credential and the control page provided by the service.

53. The method as in claim 1, wherein the user's client device comprising one of a mobile computing device including a cell phone, a personal digital assistant (PDA), and a laptop computer.

54. The method of claim 1, further comprising connecting the user's client device to the network using a wireless connection.

* * * * *

UNITED STATES PATENT AND TRADEMARK OFFICE
CERTIFICATE OF CORRECTION

| | | |
|---|---|---|
| PATENT NO. | : 7,610,616 B2 | Page 1 of 1 |
| APPLICATION NO. | : 10/943143 | |
| DATED | : October 27, 2009 | |
| INVENTOR(S) | : Masuoka et al. | |

It is certified that error appears in the above-identified patent and that said Letters Patent is hereby corrected as shown below:

Title Page, Item (75) Column 1 (Inventors), Line 4, change "Wei-Iun" to --Wei-Lun--.

Column 16, Line 5, after "in" insert --claim--.

Signed and Sealed this

Nineteenth Day of January, 2010

David J. Kappos
*Director of the United States Patent and Trademark Office*